May 11, 1954
F. MIDDLETON
2,678,134
FILTER INDICATING DEVICE
Filed Nov. 7, 1951
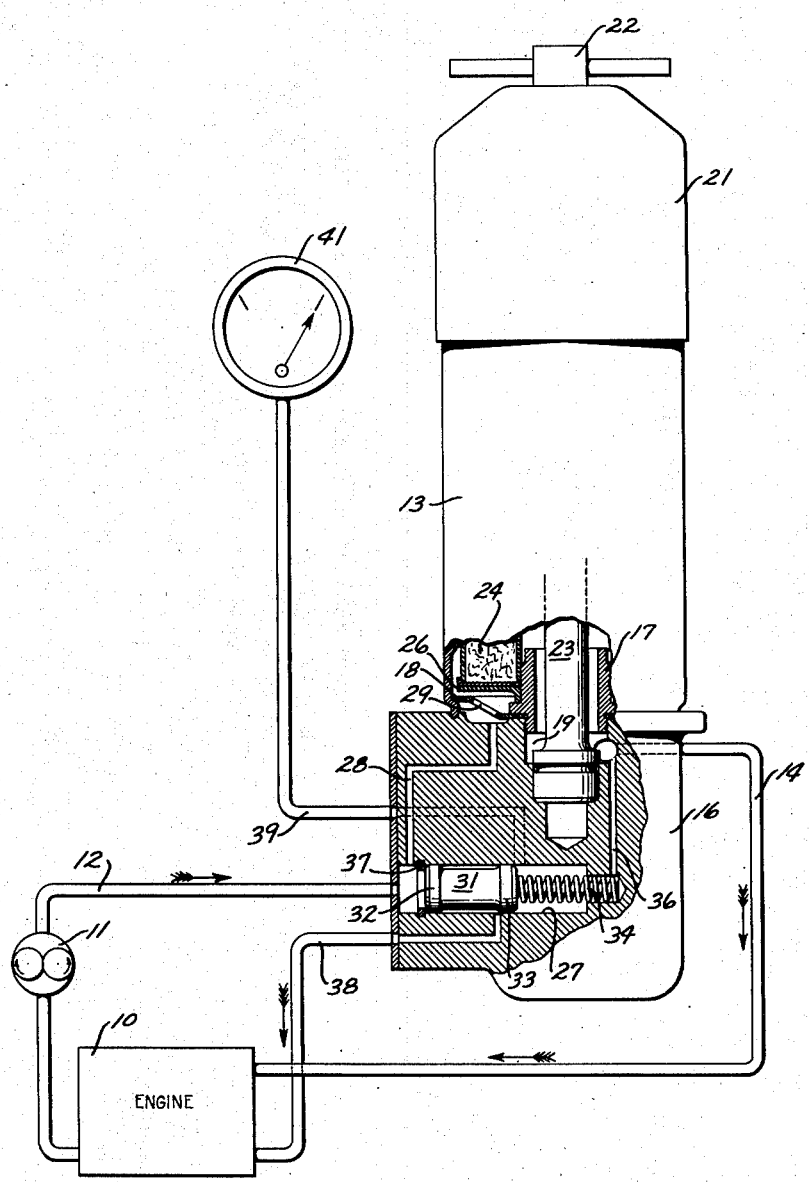
INVENTOR.
Frank Middleton
BY
Charles M. Fryer
ATTORNEY.

Patented May 11, 1954

2,678,134

UNITED STATES PATENT OFFICE 2,678,134

FILTER INDICATING DEVICE

Frank Middleton, Peoria, Ill., assignor to Caterpillar Tractor Co., Peoria, Ill., a corporation of California Application November 7, 1951, Serial No. 255,279

4 Claims. (Cl. 210—131)

1

This invention relates to fluid filters in general and more particularly to a differential pressure indicator for a filter to provide a visual indication that the pervious filter element therein has reached the end of its useful life.

This invention is particularly adapted for use in connection with filters employed for removing solid particles from the fuel or lubricating oil of an internal combustion engine and will be disclosed herein in connection with such use. Its adaptability to other uses will, however, be readily apparent.

In a filter for the lubricating oil of an internal combustion engine one of the principal difficulties encountered is determining when the filter element has become so coated or clogged that it is no longer useful. Such filters are employed for removing foreign solid particles from lubricating oil and as the solids are collected the flow of oil through the filter is gradually restricted. In the past there has been no way for the engine operator to know when this restriction becomes excessive and as a result it has been the practice to change the filter elements periodically and at intervals based on past experience. This method has the disadvantage that the filter may be either inoperative prior to the time it is replaced or on the other hand it may have many hours of satisfactory life remaining. However, the possibility of operating the engine with an inoperative filter is of principal concern as continued operation after the filter has become clogged will result in a reduced flow of oil to the engine parts requiring lubrication, or, in the event that a filter by-pass is included in the system, unfiltered oil will be directed to the engine. In either case excessive wear in the engine may result.

It is, therefore, an object of the present invention to provide a pressure differential indicator for a fluid filter for an internal combustion engine which provides a visual indication that the filter element is becoming clogged and is not in a satisfactory operating condition.

Other objects and advantages of this invention will be made apparent in the following specification wherein reference is made to the accompanying drawing.

The drawing shows a fluid filter embodying the present invention in elevation with parts in section and with a schematic representation of its connection with an internal combustion engine.

The filter shown in the drawing is illustrated in its association with the lubricating oil system of an internal combustion engine indicated

2 schematically at 10. A pump 11 is provided for circulating oil from the engine crankcase through a pipe 12 to a filter enclosed within a housing 13. After passing through the filter the oil is returned to the engine through a pipe 14 and may be distributed to the engine parts requiring lubrication in any conventional manner not shown. The housing 13 is secured to a filter base 16 by means of a flanged nut 17 extending through a suitable opening in a bottom wall 18 of the housing and having a threaded connection with the interior of a counterbore 19 in the filter base. The housing 13 is provided with a removable cap 21 secured by a wing nut 22 to a central post 23 carried in the filter base 16 and encloses a tubular filter element 24 of a conventional type. The filter element 24 embraces the central post 23 and is pressed into sealing engagement with an annular seal plate 26 carried on the nut 17. A similar plate (not shown) is disposed within the cap 21 and receives the upper end of the filter element 24.

Oil under pressure from pump 11 is directed through pipe 12 to a bored passage 27 in the filter base which communicates with the interior of the filter housing through a passage 28 in the base and an opening 29 in the bottom wall of the housing. From the interior of the filter housing the oil flows inwardly through the filter element 24 and then downwardly through the space between nut 17 and central post 23 into recess 19. From recess 19 the oil is returned to the engine parts requiring lubrication through pipe 14. A valve element 31 having spaced collars 32 and 33 is disposed for reciprocal movement in bored passage 27. The valve element is urged to the right as viewed in the drawing by the pressure of the oil before it passes through the filter element. Its movement to the right is opposed by a spring 34 and by pressure of the oil after is passes through the filter element. This pressure is transmitted to the spring end of the bore through a passage 36. Movement of the valve element under the influence of the spring is limited by an internal snap ring 37 carried in a suitable recess provided in the bore. The bore 27 is provided with longitudinally spaced openings communicating by way of passages 38 and 39 with the engine crank case and a pressure sensitive gauge 41 respectively. These openings are so spaced that when the valve element 31 is in its normal operating position as illustrated in the drawing the passage 38 is open to the space between collars 32 and 33 and passage 39 is in communication with the end of the bore 27 which is open to the pressure of the oil after it passes through the filter.

During normal operating conditions the pressure gauge 41 registers the pressure of the oil returning to the engine after it has passed through the filter element. As the filter collects foreign material increasing the pressure differential across the element the valve element 31 will be moved to the right as viewed in the drawing against the force of the spring 34. Upon movement of the valve element to the right, the collar 33 prevents communication between passage 39 and the end of bore 27 open to the pressure of the oil after it passes through the filter. Further movement of the valve element to the right opens passage 39 to passage 38. Since passage 38 communicates with the engine crankcase this is in effect a vent to atmosphere communicating with the gauge and the gauge abruptly drops to indicate lack of pressure. This, of course, signifies to the operator that the filter element is not functioning properly.

I claim:

1. In combination with a liquid filter having a filter element susceptible to clogging, a pressure sensitive gauge communicating with the discharge from the filter, a vent passage between the gauge and atmosphere and valve means normally closing the vent passage and actuated by a predetermined differential pressure between the intake and discharge sides of the filter to admit atmospheric pressure to the gauge, whereby an abrupt drop in gauge reading will indicate that the filter element is clogged.

2. In combination with a filter for a liquid having an inlet passage for directing liquid to the filtering element and a discharge passage for the filtered liquid, a pressure indicating gauge communicating with the discharge passage, a vent passage adapted to communicate with the pressure indicating gauge, and a pressure responsive valve element normally closing the vent passage and adapted to be opened by pressure in the inlet passage when pressure is reduced in the discharge passage to provide communication between the vent passage and the pressure gauge.

3. In combination with a filter for a liquid having an inlet passage for directing liquid to the filtering element and a discharge passage for the filtered liquid, a pressure indicating gauge communicating with the discharge passage, a vent passage adapted to communicate with the pressure indicating gauge, a pressure responsive valve element normally closing the vent passage, and means to actuate said valve in the event of an excessive pressure differential between the intake and exhaust passages to provide communication between the vent passage and the pressure gauge and to prevent communication between the pressure gauge and the discharge passage.

4. In combination with a liquid filter which includes an inlet passage for directing liquid to a filter element and a discharge passage for the filtered liquid, a valve chamber with a sliding valve element therein and having one end communicating with the inlet passage and the other end communicating with the discharge passage, spring means urging the valve element toward the inlet passage end of the chamber but opposed by inlet pressure, a gauge communicating with the discharge passage through a valve opening in said chamber, said chamber having a vent opening closed by the valve in its normal position and opened to communication with the gauge when pressure in the discharge passage is reduced and pressure in the inlet passage effects sliding of the valve element.

References Cited in the file of this patent

UNITED STATES PATENTS

| Number | Name | Date |
|---|---|---|
| 1,613,467 | Liddell | Jan. 4, 1927 |
| 1,696,367 | Stephens | Dec. 25, 1928 |
| 2,365,766 | Levier | Dec. 26, 1944 |